US008661509B2

(12) United States Patent　　(10) Patent No.: US 8,661,509 B2
Smith et al.　　(45) Date of Patent: *Feb. 25, 2014

(54) SOLICITED AUTHENTICATION OF A SPECIFIC USER

(75) Inventors: Jeffrey C. Smith, Atherton, CA (US); Jean-Christophe Bandini, Brussels (BE)

(73) Assignee: Axway Inc., Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/560,986

(22) Filed: Jul. 27, 2012

(65) Prior Publication Data

US 2013/0138747 A1　　May 30, 2013

Related U.S. Application Data

(63) Continuation of application No. 12/098,321, filed on Apr. 4, 2008, now Pat. No. 8,234,690, which is a continuation of application No. 10/763,968, filed on Jan. 23, 2004, now Pat. No. 7,356,834, which is a continuation of application No. 09/387,444, filed on Aug. 31, 1999, now Pat. No. 6,725,381.

(51) Int. Cl.
　　*H04L 9/32*　　(2006.01)

(52) U.S. Cl.
　　USPC ................................ 726/2; 726/3; 726/4

(58) Field of Classification Search
　　USPC .................. 726/2–10; 713/168; 705/64, 67
　　See application file for complete search history.

(56) References Cited

U.S. PATENT DOCUMENTS

| 6,292,904 B1 * | 9/2001 | Broomhall et al. ............... 714/1 |
| 6,449,599 B1 * | 9/2002 | Payne et al. .................... 705/64 |
| 7,185,364 B2 * | 2/2007 | Knouse et al. .................... 726/8 |

* cited by examiner

*Primary Examiner* — Hosuk Song
(74) *Attorney, Agent, or Firm* — Haynes and Boone, LLP

(57) ABSTRACT

Secure web-based messaging according to a "push" paradigm is augmented by specific, intended recipient authentication. In particular, a document can be sent to a specified, intended recipient through the Web using e-mail recipient notification, and the recipient is authenticated prior to delivering the document to the recipient. Such authentication prevents a cracker from snooping a delivery notification e-mail message and retrieving the document prior to retrieval by the true intended recipient. In addition, such authentication of the recipient is driven by the sender such that prior participation by the recipient in the messaging system according to the present invention is required.

13 Claims, 3 Drawing Sheets

SOLICITED AUTHENTICATION OF A SPECIFIC USER

CROSS-REFERENCE TO RELATED APPLICATION

This application is a continuation of U.S. application Ser. No. 12/098,321, filed Apr. 4, 2008, which itself is a continuation of U.S. application Ser. No. 10/763,968, filed Jan. 23, 2004, now U.S. Pat. No. 7,356,834, which is itself a continuation of U.S. application Ser. No. 09/387,444, filed Aug. 31, 1999, now U.S. Pat. No. 6,725,381. application Ser. Nos. 12/098,321, 10/763,968 and 09/387,444 are each incorporated herein by reference.

BACKGROUND

1. Field of the Invention

The invention relates to data transfer through computer networks and, in particular, to a mechanism by which a specific intended recipient of a delivered document can be authenticated without prior participation by the intended recipient.

2. Description of the Related Art

The Internet has grown tremendously in recent years, both in terms of number of users and the amount of data transferred through the Internet. Originally, the Internet was a data transfer medium for academia and then engineers and private users grew in use and familiarity with the Internet. Increasingly, the Internet is becoming an acceptable communication medium for business. However, business users demand more confidentiality and traceability of communication.

Business users often communicate sensitive, confidential, and proprietary information and, accordingly, expect such communication to be secure from unauthorized eavesdropping. In addition, business users expect to be able to store records tracing correspondence. Accordingly, for the Internet to provide a medium for business communication, Internet-based communication must be made secure and traceable.

The primary medium for person-to-person communication through the Internet is e-mail, using the simple mail transfer protocol (SMTP) and the post office protocol (POP). Internet e-mail is text-based. Only textual data in ASCII format is transferrable according to SMTP, Binary, non-textual files can be transferred through SMTP, but only after encoding the binary files in a textual format. Such can be done, for example, using uuencode, BinHex, or Base 64 encoding. However, it is the responsibility of the receiving user to decode the textual format to reconstruct the binary file. Most currently available e-mail readers provide the ability to encode and decode binary files according to the more popular encoding protocols; however, such introduces the possibility that encoding and decoding can introduce errors in the attached binary files. In particular, some e-mail routers can determine that some characters are non-essential, such as trailing spaces, and alter the textual data as the e-mail message passes through. Such can introduce errors in a binary file encoded in a textual format where such characters are, in fact, essential.

Furthermore, e-mail messages are not easily traceable. A sender of an e-mail message can request a return receipt indicating that the recipient received the message, but the recipient can cause her e-mail reader to refuse to send such a return receipt. In addition, a particular e-mail reader may not support return receipts.

Most importantly, e-mail through the Internet is not secure. Information transferred through the Internet can be snooped, i.e., the information can be read as the information is passed from router to router through the Internet. Encrypting information transferred through the Internet makes snooping of the information significantly more difficult. Unfortunately, such encrypting also makes sending information through the Internet significantly more difficult. For example, the sender and recipient must agree as to which of the multitude of encryption types to use. The sender must encrypt a binary file before sending the encrypted binary file through e-mail as an encoded binary attachment in textual form. The recipient must decode the attached binary file and decrypt the decoded binary file to recover the original binary file.

While e-mail readers are increasingly supporting encryption and decryption of attached binary files, such support is neither uniform nor standardized. In general, users must separately acquire, install, and use whatever encryption software is required. Most new users of the Internet are novice computer users and such selection, acquisition, installation, and use of encryption software is a daunting task. When the objective is a simple message to a colleague, encryption and security are all-too-often simply bypassed.

Accordingly, Internet e-mail is an unsatisfactory solution for business communication. Web-based communication is similarly unsatisfactory.

The World Wide Web (WWW or "the Web") is a portion of the Internet in which information is cataloged and cross-referenced by including links within documents to reference other documents. Information transfer through the Web is according to the HyperText Markup Language (HTML). An emerging markup language is the Extensible Markup Language (XML). Both are types of Standard Generalized Markup Languages (SGMLs).

Information transfers through the Web can be secure and can be in a native, binary data format. Secure information transfer uses the known Secure Sockets Layer (SSL). While e-mail transfers information according to a "push" paradigm in which the information transfer is driven by the sender, information transfer through the Web is recipient-driven according to a "pull" paradigm. Therefore, a message directed from one user to another is not readily implemented through the Web.

Web-based e-mail has grown recently in popularity. One of the major advantages of web-based e-mail is that web-based e-mail is retrievable anywhere one has access to a web browser. However, sending information using web-based e-mail has a few disadvantages. First, web-based e-mail still uses regular e-mail servers and routers to transfer e-mail, so the messages still travel through unsecured channels and must go through encoding/decoding. Second, web-based e-mail is recipient selected; specifically, the recipient must have established a web-based e-mail account. The sender cannot specify that a message be sent through web-based e-mail unless the recipient has already established a web-based e-mail account.

SUMMARY

In accordance with the present invention, secure web-based messaging according to a "push" paradigm is augmented by specific, intended recipient authentication. In particular, a document can be sent to a specified, intended recipient through the Web using e-mail recipient notification, and the recipient is authenticated prior to delivering the document to the recipient. Such authentication prevents a cracker from snooping a delivery notification e-mail message and retrieving the document prior to retrieval by the true intended recipient. In addition, such authentication of the recipient is driven by the sender such that prior participation by the recipient in the messaging system according to the present invention is not required.

The sender specifies secret information which is believed to be known to the intended recipient and to few others, if any. The recipient must supply this information to download the delivered document. Since the intended recipient may not be expecting the document delivery and may not know the nature of the requisite information, the sender can also supply a prompt by which the recipient can surmise the requisite secret information.

The recipient supplies information by which a user account is created for the recipient prior to downloading the delivered document. Such information is forwarded to an information server for verification. For example, if the recipient is required to enter her full name and a credit card number, the information server—a credit card authorization server in this example—can verify that the supplied credit card number is in fact associated with the supplied full name.

Once the account is created, two e-mail mechanisms can be used—both together or either in isolation—to add further assurances with respect to the recipient's identity. A verification e-mail message can be sent following creation of the user account for the recipient. The verification e-mail message contains a URL by which the recipient can download the delivered document. To gain unauthorized access to the delivered document, a cracker must snoop two separate e-mail messages which is significantly more difficult than snooping a single e-mail message. In addition, a confirmation e-mail message can be sent to the recipient notifying the recipient of the creation of a user account in the recipient's name. The confirmation e-mail message also includes instructions regarding the reporting of potentially unauthorized creation of the user account. Maintain an improperly created user account by a cracker, the cracker must not only snoop multiple e-mail messages but also block the confirmation e-mail message. Blocking e-mail messages is much more difficult than snooping e-mail messages.

These mechanisms, individually or in combination, provide significantly increased assurance that the recipient of a delivered document is in fact the party intended by the sender.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT

Figure 1:
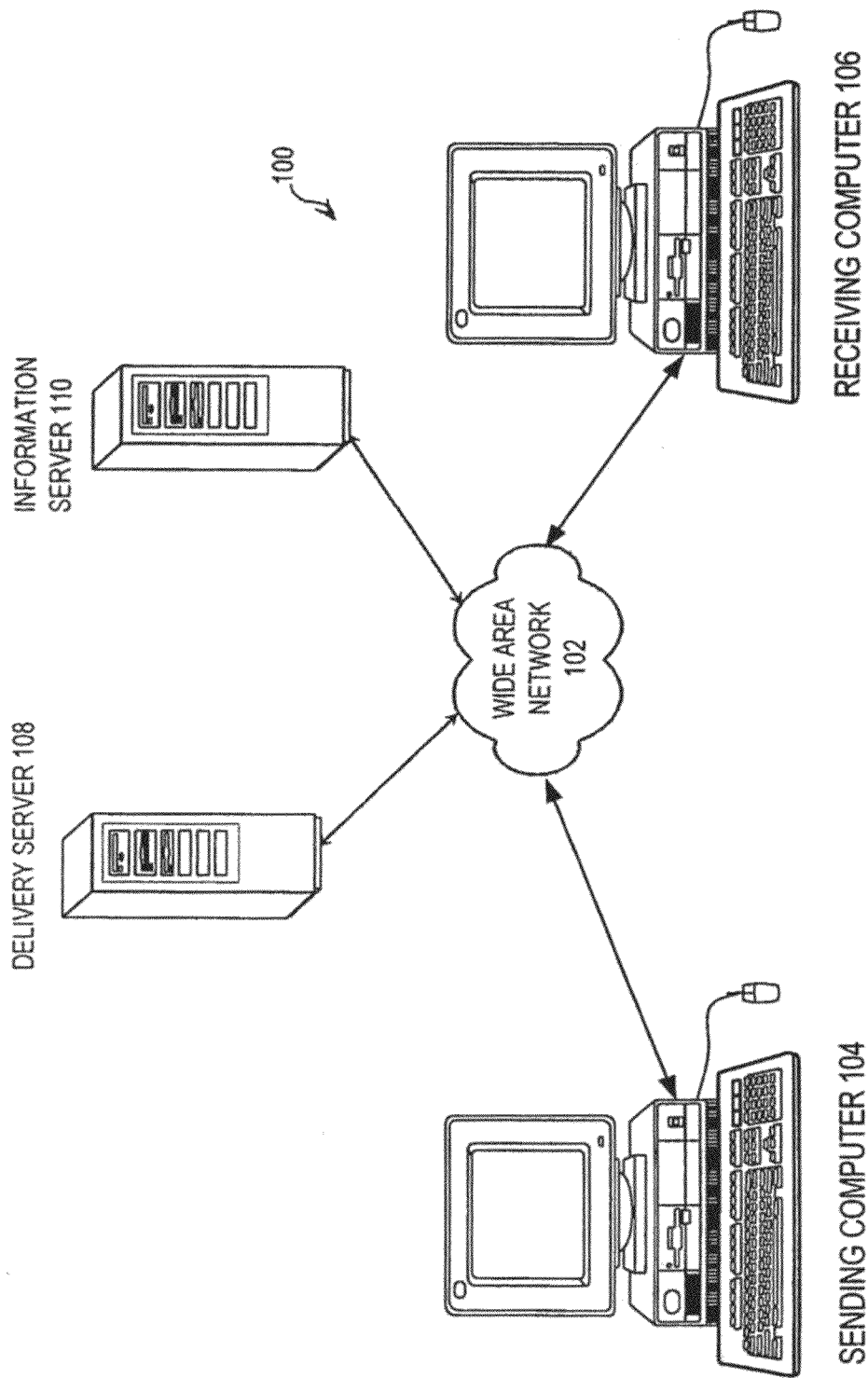
FIG. 1 is a block diagram of a delivery system in accordance with the present invention.

In accordance with the present invention, secure web-based messaging according to a "push" paradigm is augmented by specific, intended recipient authentication. In particular, a document can be sent to a specified, intended recipient through the Web using e-mail recipient notification, and the recipient is authenticated prior to delivering the document to the recipient. Such authentication prevents a cracker from snooping a delivery notification e-mail message and retrieving the document prior to retrieval by the true intended recipient. In addition, such authentication of the recipient is driven by the sender such that prior participation by the recipient in the messaging system according to the present invention is not required.

A brief overview of a messaging and document delivery system 100 (FIG. 1) according to the present invention is helpful in appreciating a more detailed description below. A user of sending computer 104 wishes to send a document, i.e., the subject document, to a user of receiving computer 106. A document, as used herein, refers to a computer-readable data file, which typically has content which can be represented to a user and which typically is represented using non-textual data at least in part. Sending computer 104 and receiving computer 106 are coupled to one another through a wide area computer network 102, which is the Internet in this illustrative embodiment. Computers 104 and 106 are also coupled to a delivery server 108 and an information server 110, both of which are also coupled to wide area computer network 102.

Information server 110 can be provided by an entity which is independent of the provider of delivery server 108 and computer 104 and 106. Information server 110 generally serves information queries for a large number of users. In this illustrative embodiment, information server 110 is a credit card authorization server and can verify personal information of a large number of users. Such personal information can include, for example, home addresses and credit card numbers.

To effect delivery of the subject document, the user of sending computer 104, who is sometimes called the sender, sends the subject document and data identifying the user of receiving computer 106, who is sometimes called the recipient, to delivery server 108 using HTTP (HyperText Transfer Protocol). HTTP is a protocol by which HTML, XML, and other SGML data files are transferred. HTTP supports transfer of binary data files without textual format encoding and decoding and supports secure data transfer with the known SSL (Secure Sockets Layer). The sender can also send data specifying a number of delivery parameters, including a security protocol for delivery. The most secure protocol requires that the recipient enter an account password which is known to delivery server 108 prior to delivery of the subject document.

Delivery server 108 sends an e-mail message to the recipient and the e-mail message is directed to receiving computer 106 using conventional e-mail routing protocols. Delivery server 108 includes a personalized universal resource locator (URL) in the e-mail message with instructions to the recipient to use the URL to retrieve the subject document. By sending the notification through e-mail, system 100 supports directed, "push" paradigm messaging and document delivery.

To receive the subject document, the recipient sends the URL from the notification e-mail message to delivery server 108. In response to the URL, delivery server 108 sends the subject document to the recipient at receiving computer 106. However, delivery server 108 sends the subject document in accordance with any parameters specified by the sender. For example, if the sender specified that delivery server 108 must first authenticate the recipient prior to completing delivery of the subject document, delivery server 108 does so. One difficulty addressed by system 100 in accordance with the present invention is the case in which such authentication is required for a recipient who has not previously participated in the document delivery and messaging of system 100. In such a situation, delivery server 108 has no specific, secret information regarding the recipient by which to authenticate the recipient.

Figure 3:
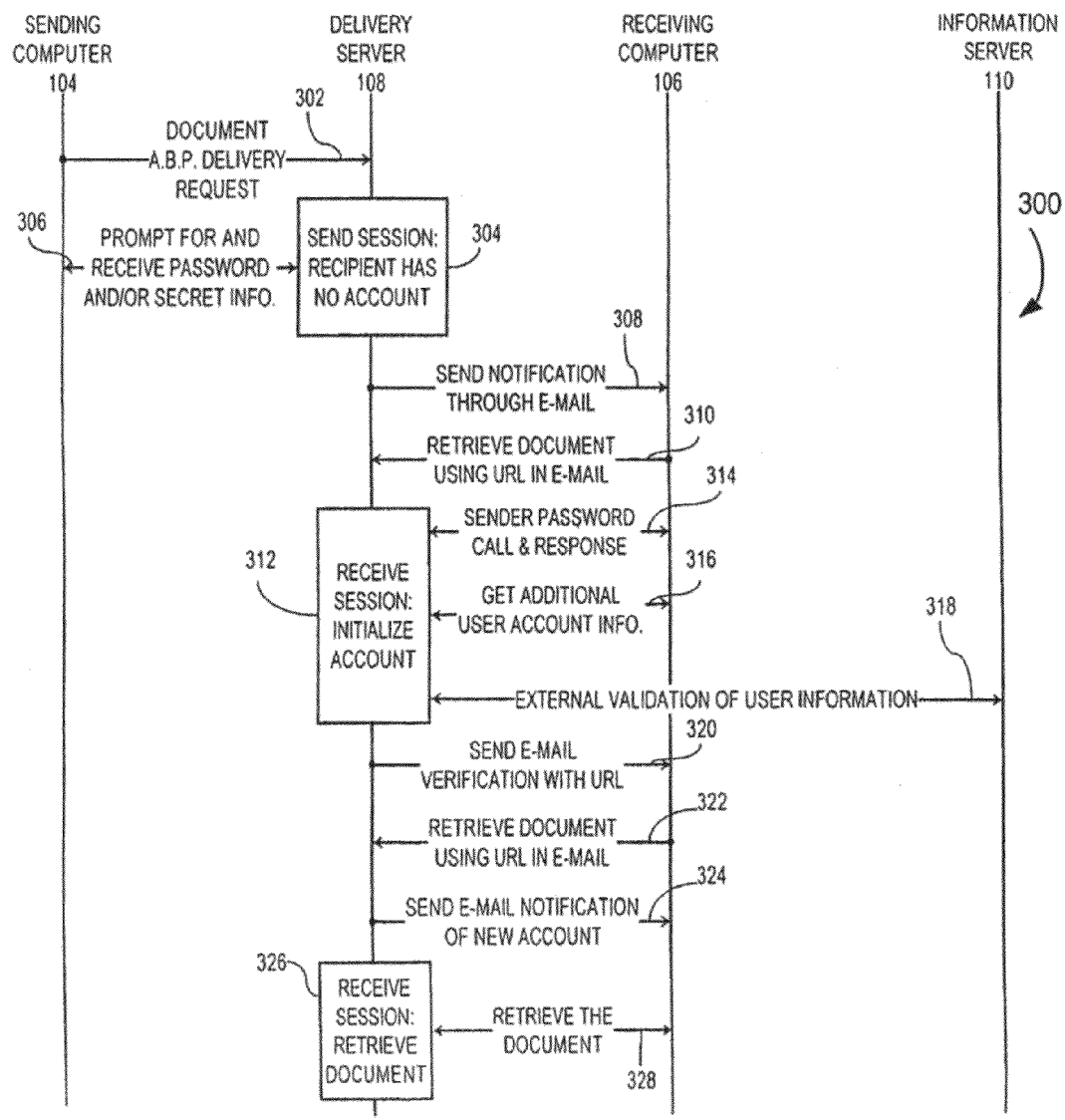
FIG. 3 is a flow diagram illustrating recipient authentication by the delivery server of FIG. 2 in accordance with the present invention.

Just allowing a new recipient to self-authenticate is an inadequate solution since the sender has a specific recipient in mind when sending the subject document. Additional authentication is required. Such additional authentication in accordance with the present invention is illustrated in flow diagram 300 (FIG. 3). In step 302, the sender sends a request to delivery server 108 to deliver the subject document to the recipient. In this illustrative example, the sender specifies that delivery server 108 is to authenticate the specified recipient prior to completing delivery of the subject document.

Figure 2:
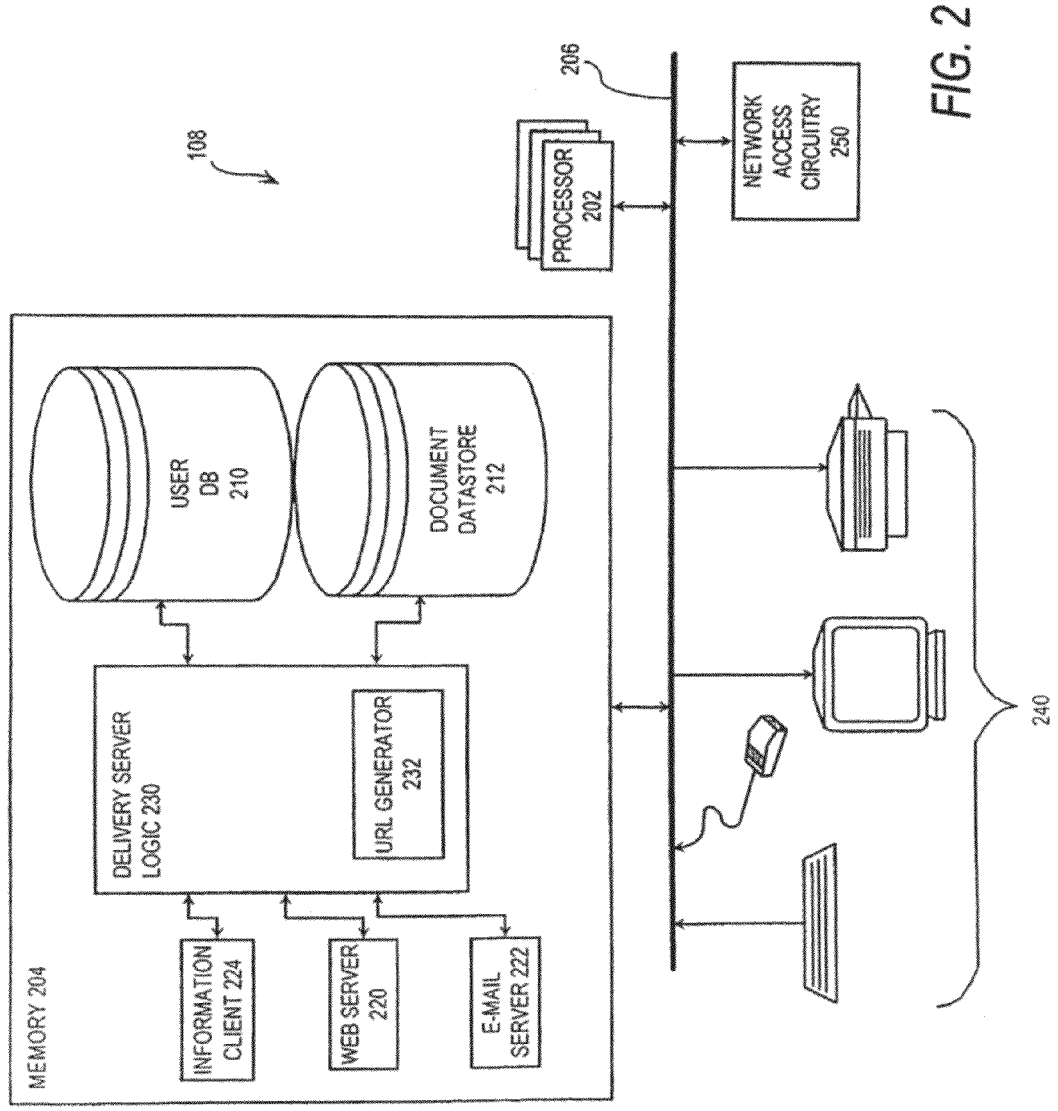
FIG. 2 is a block diagram of the delivery server of FIG. 1 in greater detail

Delivery server 108 includes delivery server logic 230 (FIG. 2) and a web server 220. The sender sends the subject document to web server 220 using HTTP and specifies the recipient and delivery parameters using HTML forms. Web server 220 receives the subject document and the form data and passes the form data to delivery server logic 230 for processing. Delivery server logic 230 stores the subject document in a document datastore 212 and associates the received recipient address and delivery parameters with the subject document.

By reference to a user database 210, delivery server 108 determines that the recipient has not previously established an account with delivery server 108 and so cannot be authenticated according to than account with delivery server 108. As a result, delivery server 108 uses other mechanisms to authenticate the recipient.

Delivery server 108 conducts a dialog 304 (FIG. 3) with the sender to acquire secret information about the recipient. Delivery server 108 conducts the dialog using HTML scripts in this illustrative example. The secret information is selected by the sender and can be any information which the sender believes to be known to the recipient and to few others if any. If the sender wishes to send highly sensitive and confidential information to the recipient, it is likely that the sender will know something about the recipient which is known to a relatively few others, if any. For example, if the sender is an attorney and the recipient is a client, the attorneys can use a file number or the recipient's social security number as the secret information about the recipient.

Since the recipient might not be expecting a document delivery, the recipient might not anticipate the particular piece of information selected by the sender for authentication purposes. Accordingly, the sender also provides a prompt for the secret information. For example, if the secret information of the recipient is the recipient's social security number, the sender can specify "What is your social security number?" as the prompt. Alternatively, the sender can specify a general purpose password and communicate the password to the recipient through independent, preferably secure, communications media. For example, the sender can select a general purpose password and communicate the password to the recipient by telephone or fax.

In step 306 (FIG. 3), the sender specifies the secret information of the recipient and sends the information to delivery server 108 as HTML form data, for example. Web server 220 (FIG. 2) receives the form data and stores the secret information in user database 210 in a placeholder user account record. The placeholder account is an incomplete user account record but stores sufficient information to later authenticate the recipient, Within the placeholder user account record, delivery server logic 230 associates the stored secret information with the data specifying the recipient, e.g., the recipients e-mail address in this illustrative example.

In step 308 (FIG. 3), delivery server 108 notifies the recipient through e-mail that a document is awaiting retrieval. In particular, delivery server logic 230 (FIG. 2) includes a URL generator 232 which generates a URL specific to the recipient and specific to the subject document. Delivery server logic 230 forms an e-mail message containing the URL and sends the e-mail message to the recipient using e-mail server 222. To gain unauthorized access to the subject document, a cracker would have to snoop the delivery notification e-mail message and present the URL to Web server 220 in an attempt to pose as the intended recipient.

in step 310 (FIG. 3), the recipient supplies the URL of the notification e-mail to a web browser which sends the URL to Web server 220 of delivery server 108. Web server 222 forwards the URL to delivery server logic 230 which parses the URL identifies both the recipient and the subject document from the parsed URL. Delivery server logic 230 retrieves the delivery parameters associated with the subject document as specified by the sender and determines that the sender requested recipient authentication by delivery server 108 prior to completing delivery to the recipient. In addition, delivery server logic 230 retrieves a user account record for the recipient in preparation for authentication of the recipient and determines that the user account recorded retrieved from user database 210 is a placeholder account record. If delivery server logic 230 determines that authentication of the recipient is not specified, delivery server logic 230 immediately proceeds to make the subject document available for download by the recipient as described below. If delivery server logic 230 determines that the account record of the recipient is a complete record and not a placeholder, delivery server logic 230 requests and requires a user account password from the recipient before making the subject document available for download. However, if the authentication is required and the recipient's account is a placeholder account, delivery server logic 230 implements a dialog 312 (FIG. 3) with the recipient. Dialog 312 is implemented using HTML forms in this illustrative embodiment.

In step 314 of dialog 312, delivery server 108 prompts the recipient for the secret information specified by the sender. If the sender supplied a prompt, that prompt is provided to the recipient. By specifying information the recipient should have in addition to the recipient's e-mail address, delivery server 108 allows the sender to provide added security regarding the authenticity of the recipient.

If the recipient supplies incorrect responses to the prompt, delivery server 108 refuses to download the subject document. Accordingly, a cracker having snooped the previous notification e-mail message would have to also know the secret information required by the sender to gain unauthorized access to the subject document. In addition, after a predetermined number of incorrect responses, delivery server 108 terminates dialog 312 to prevent crackers from repeatedly attempting to guess the secret information and improperly obtain the subject document. If the secret information supplied by the recipient is accurate, delivery server 108 proceeds to step 316 in which the recipient is required to supply information regarding a new account to be created for the recipient. Such information includes, for example, a new password by which the recipient can be authenticated in the future. However, the recipient is not permitted to alter the e-mail address by which the sender identified the recipient.

In step 318 (FIG. 3), delivery server logic 230 (FIG. 2) attempts to authenticate the recipient through an information client 224. Information client 224 sends information regarding the recipient to an information server 110 for verification. In one embodiment, information server 110 is a credit card authorization server and information client 224 (FIG. 2) sends the name and credit card number of the recipient, which are entered in step 316 above in this embodiment, for verification. Credit card authorization servers and clients are known and conventional. Verification of information supplied by the recipient in creating a new user account for the recipient using third-party information servers significantly enhances confidence in the authenticity of the recipient, provided of course that the information verified with information server 110 is known to very few.

Once the recipient has provided the requisite information for creating a new user account, delivery server logic 230 updates the user account record of user database 210 (FIG. 2) for the recipient such that the user account record is complete and is no longer a placeholder account record. In addition, in step 320 (FIG. 3), delivery server logic 230 (FIG. 2) sends a verification e-mail to the recipient at the e-mail address specified by the sender. Delivery server logic 230 includes a second URL which specifies the recipient and the subject document and which is generated by URL generator 232. This second e-mail message containing a URL required to access the subject document adds further security. Assuming a cracker is successful in snooping the first notification e-mail message and supplying the required secret information, the cracker must snoop a second notification e-mail message to gain access to the subject document.

In step 322 (FIG. 3), the recipient submits the URL from the second e-mail message to Web server 220 (FIG. 2) to access the subject document. Web server 220 passes the URL to delivery server logic 230 which in turn parses the URL to identify the recipient and the subject document. Delivery server logic 230 also builds and sends through e-mail server 222 a confirmation e-mail message to the recipient in step 324 (FIG. 3). The confirmation e-mail message reports-that a new account has been established in the name of the recipient and can provide some information regarding the account. Preferably, the information is not particularly secret since such information can be snooped and can provide the basis for subsequent user authentication. Such information can include, for example, the user's full name and the date and time at which the account was created in step 316 (FIG. 3) above.

If a cracker had snooped the previous notification and verification e-mail messages, the e-mail message would have been allowed to pass through to the recipient and such snoop could have been undetected. Accordingly, access to the subject document by such a cracker could have gone undetected. However, the confirmation e-mail message of step 324 reports the creation of a new user account. If the recipient receives the e-mail message and has not created such an account, the recipient can report a breach of security and corrective steps can be taken. For example, the subject document can be immediately made unavailable and the previously created user account for the recipient can be invalidated. Therefore, to successfully access the subject document without detection, a cracker would have to snoop several e-mail messages and block at least the confirmation e-mail message of step 324 such that the confirmation e-mail message never reaches the originally intended recipient. Blocking an e-mail message is much more difficult than snooping an e-mail message. Snooping only requires read access to a single copy of a message as the message is propagated through the wide area network. Blocking requires delete and/or write access to every copy of the e-mail message as the e-mail message is propagated through the wide area network. While sending a confirmation e-mail message in step 324 does not prevent unauthorized access to the subject document, it does prevent wide-spread security failures in the form of a cracker posing as the recipient for subsequent document deliveries.

After sending the confirmation e-mail, delivery server logic 230 (FIG. 2) conducts a receive session 326 (FIG. 3) with the recipient in which the recipient is permitted to download the subject document in step 326. The subject document is identified by URLs submitted through Web server 220 to delivery server logic 230 in steps 310 (FIG. 3) and 322. By session 326, delivery server logic 230 has adequately authenticated the recipient to be the recipient intended by the sender in accordance with the present invention.

Processing according to flow diagram 300 provides a number mechanisms by which the recipient intended by the sender can be authenticated without prior interaction with the recipient. When used together, these mechanisms provide a high degree of certainty that the recipient is properly authenticated. However, omitting one or more of the mechanisms still provides substantial assurance that the subject document is in fact delivered to the recipient intended by the sender. For example, if the sender prefers not to specify secret information that is known by the intended recipient, steps 306 and 314 can be omitted. Instead, authentication of the recipient relies upon notification, verification, and confirmation e-mail messages of steps 308, 320, and 324.

Similarly, authentication of the recipient can rely upon the call and response of secret information provide by the sender in step 314 and steps 320-322 and/or step 324 can be omitted. It is incumbent upon the designer of delivery server 108 to determine the particular uses and needs of delivery server 108 and to select an appropriate selection of the authentication mechanisms described above. In particular, each of the mechanisms described above introduces a degree of inconvenience to either the sender or the recipient or both. However, it should be remembered that the sender and recipient are required to go through the above-described authentication steps just once. Afterward, the recipient has an account within delivery server 108 and can be authenticated in the same way other users of delivery system 108 are authenticated, e.g., by entering a user identification and associate password. As an alternative to assigning design decisions in reaching an optimum compromise between security and user convenience, the following can be presented as optional authentication mechanisms which can be individually selected by the sender: (i) secret information call and response in steps 306 and 314; (ii) external validation of user information through external information server in step 318; (iii) verification e-mail message of steps 320-322; and (iv) conformation e-mail message in step 324.

Delivery server 108 is of a general computer architecture which is common today. In particular, delivery server 108 includes one or more processors 202 which are couple through an interconnect 206 to a memory 204. Interconnect 206 can be generally any kind of interconnect including, for example, a bus, hypercube, or mesh. Memory 206 can include any type of computer accessible memory including, for example, random access memory (RAM), read-only memory (ROM), and computer accessible storage media such as magnetic and optical disks. Processors 202 retrieve computer instructions from memory 204 through interconnect 206 and execute those instructions. In accordance with those instructions, processors 202 can read data from and write data to memory 206. Delivery server 108 can also include a number of user input and/or output devices 240 by which a user can control operation of delivery server 108 using conventional user interface techniques and view data. User input/output devices 240 are coupled to processors 202 and memory 204 through interconnect 206. In addition, delivery server 108 include network access circuitry 250 which is coupled to the remainder of delivery server 108 through interconnect 206 and which is coupled to wide area network 102 (FIG. 1). Network access circuitry 250 (FIG. 2) conducts data transfers through wide area network 102 (FIG. 1) and can be, for example, a modem or Ethernet circuitry.

The above description is illustrative only and is not limiting. Instead, the present invention is defined solely by the claims which follow and their full range or equivalents.

What is claimed is:

1. A method of securely directing private information to a recipient, the method comprising:
responsive to a sender's web server mediated request to deliver a first document to the recipient, determining that the recipient is not currently enrolled for authenticated access to the private information and prompting the sender in a web server mediated dialog to provide both a secret and a prompt to elicit the secret from the recipient;
transmitting a first message to the recipient via a messaging system, the first message including a recipient-specific resource locator;
responsive to a retrieval using the recipient-specific resource locator, authenticating identity of the recipient in a webserver mediated dialog that includes the sender provided prompt and that compares a response thereto to the secret previously provided by the sender; and
after determining that the response accurately supplies the secret, enrolling the recipient for authenticated access to the private information and thereafter providing the authenticated recipient with access to the first document.

2. The method of claim 1,
wherein the providing with access includes transmitting a second message that verifies enrollment of the recipient and includes a second resource locator by which the recipient may retrieve the first document.

3. The method of claim 1,
wherein the providing with access includes web server mediated delivery of the first document in response to a retrieval by the authenticated recipient.

4. The method of claim 1,
wherein the secret specifies authentication information known, or separately communicated to, the intended recipient but generally unknown to others; and
wherein the authenticating includes verifying information received from the recipient against the authentication information received from the sender.

5. The method of claim 1,
wherein the first message is an e-mail message; and
wherein the resource locator includes an URL and the authenticating is performed using a dialog that is at least initiated using content supplied to the recipient based on the URL.

6. The method of claim 1, further comprising:
prior to the transmitting of the first message, receiving from a sender of the private information at least one additional criterion for authenticating identity of the recipient, wherein the received additional criterion identifies a type of authentication information for verification against a third-party information service, but does not specify the particular information with which identity of the recipient is to be authenticated.

7. The method of claim 6,
wherein the third-party information service includes a credit card authorization server, and
wherein the sender neither supplies, nor has access to, credit card information of the recipient.

8. The method of claim 6, further comprising:
communicating at least some of the information received from the recipient to the third-party information service; and
receiving verification from the third-party information service.

9. The method of claim 1, further comprising:
verifying information received from the recipient using a third-party information service.

10. A non-transitory computer program product embodied in one or more computer readable media selected from the set of a disk, tape or other magnetic, optical or electronic storage and encoding instructions executable on a delivery service platform to implement the method of claim 1.

11. An apparatus comprising:
a delivery server that, responsive to a sender's web server mediated request to deliver a first document to a recipient, is configured to determine whether the recipient is not currently enrolled for authenticated access to the private information and, if the recipient is not currently enrolled, to prompt the sender in a web server mediated dialog to provide both a secret and a prompt to elicit the secret from the recipient;
the delivery server including a messaging interface for transmission of a first message to the recipient, the first message including a recipient-specific resource locator; and
the delivery server, responsive to a retrieval using the recipient-specific resource locator, configured to authenticate identity of the recipient in a webserver mediated dialog that includes the sender provided prompt and that compares a response thereto to the secret previously provided by the sender; and after determining that the response accurately supplies the secret, to enroll the recipient for authenticated access to the private information and thereafter provide the authenticated recipient with access to the first document.

12. The apparatus of claim 11
wherein access provided by the delivery server includes transmitting a second message that verifies enrollment of the recipient and includes a second resource locator by which the recipient may retrieve the first document.

13. The apparatus of claim 11,
wherein access provided by the delivery server includes web server mediated delivery of the first document in response to a retrieval by the authenticated recipient.

* * * * *